United States Patent [19]

Holt et al.

[11] Patent Number: 4,601,004
[45] Date of Patent: Jul. 15, 1986

[54] MICROCOMPUTER CONTROLLED COOKING TIMER AND METHOD

[75] Inventors: Ronald R. Holt, Schaumburg; William A. Joseph; Edward J. Zeissler, both of Elburn, all of Ill.

[73] Assignee: National Controls Corporation, Lombard, Ill.

[21] Appl. No.: 326,845

[22] Filed: Dec. 3, 1981

[51] Int. Cl.[4] ............................................. G06F 15/20
[52] U.S. Cl. .................................... 364/557; 99/328; 364/571; 374/170
[58] Field of Search .................. 364/557, 569, 571; 374/102, 170; 432/18, 19, 24, 36, 51; 219/10.55 B, 419, 492, 497, 489; 99/328, 329 R, 336, 344, 403

[56] References Cited

U.S. PATENT DOCUMENTS

| | | | |
|---|---|---|---|
| 3,242,849 | 3/1966 | Wells | 99/336 |
| 3,866,472 | 2/1975 | Witt | 374/102 X |
| 3,979,056 | 9/1976 | Barnes | 219/489 X |
| 4,158,431 | 6/1979 | van Bauel et al. | 364/900 |
| 4,197,581 | 4/1980 | Watrous et al. | 364/184 |
| 4,309,584 | 1/1982 | Terakami | 219/10.55 B |
| 4,362,094 | 12/1982 | Polster | 374/170 X |
| 4,437,159 | 3/1984 | Waugh | 364/557 X |

Primary Examiner—Errol A. Krass
Assistant Examiner—Edward R. Cosimano
Attorney, Agent, or Firm—David A. Lundy

[57] ABSTRACT

A microcomputer controlled cooking apparatus and method including a plurality of presettable time and temperature circuits which allow for the programming into a cooking device of ideal cook time and temperature data. A microcomputer continuously monitors actual cooking conditions and automatically adjusts the cooking time of a food item in accordance with variations in temperature. These adjustments are computed in reference to an optimum temperature/time curve.

36 Claims, 9 Drawing Figures

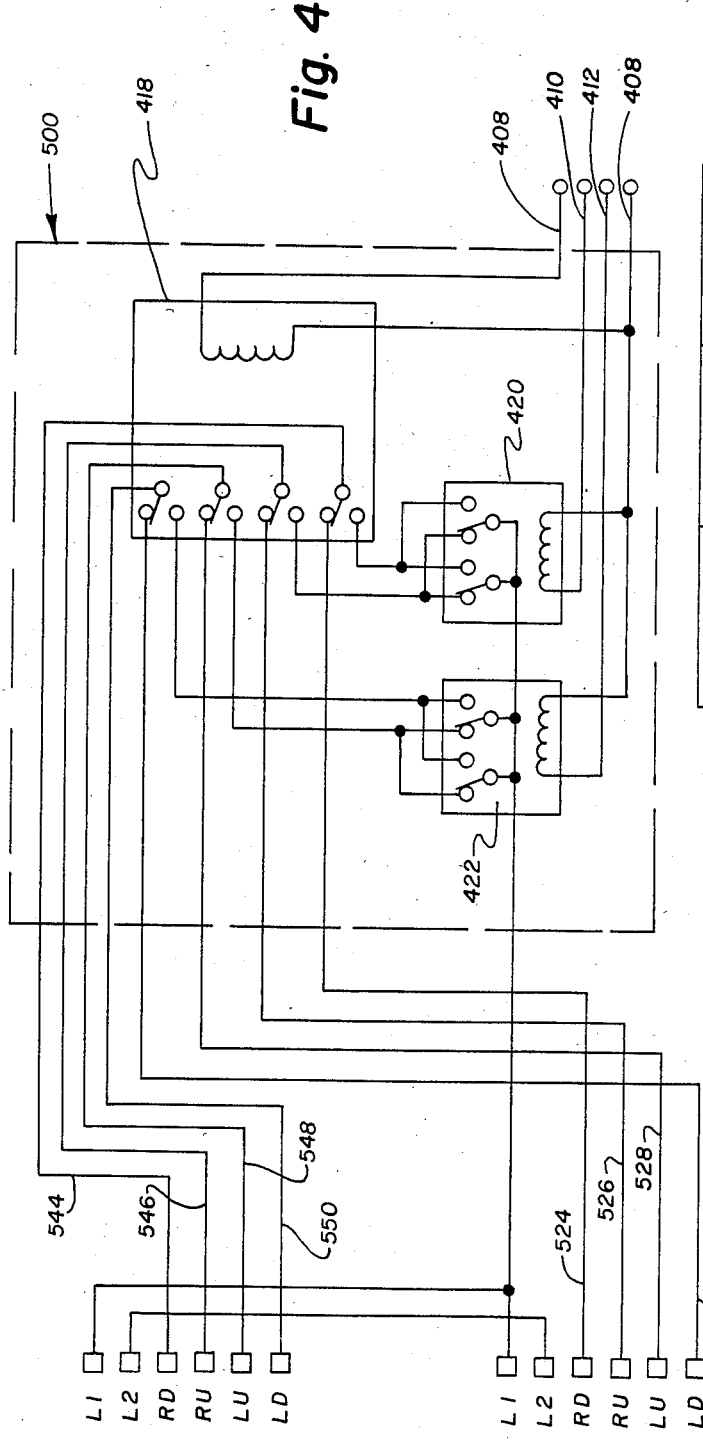
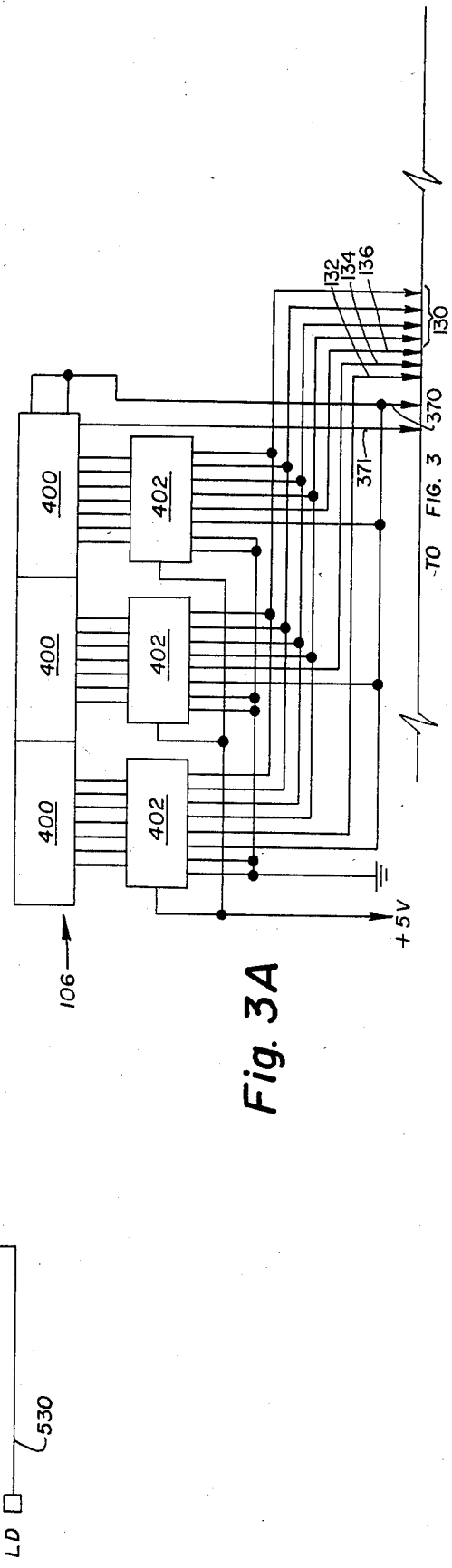
Fig. 4
Fig. 3A

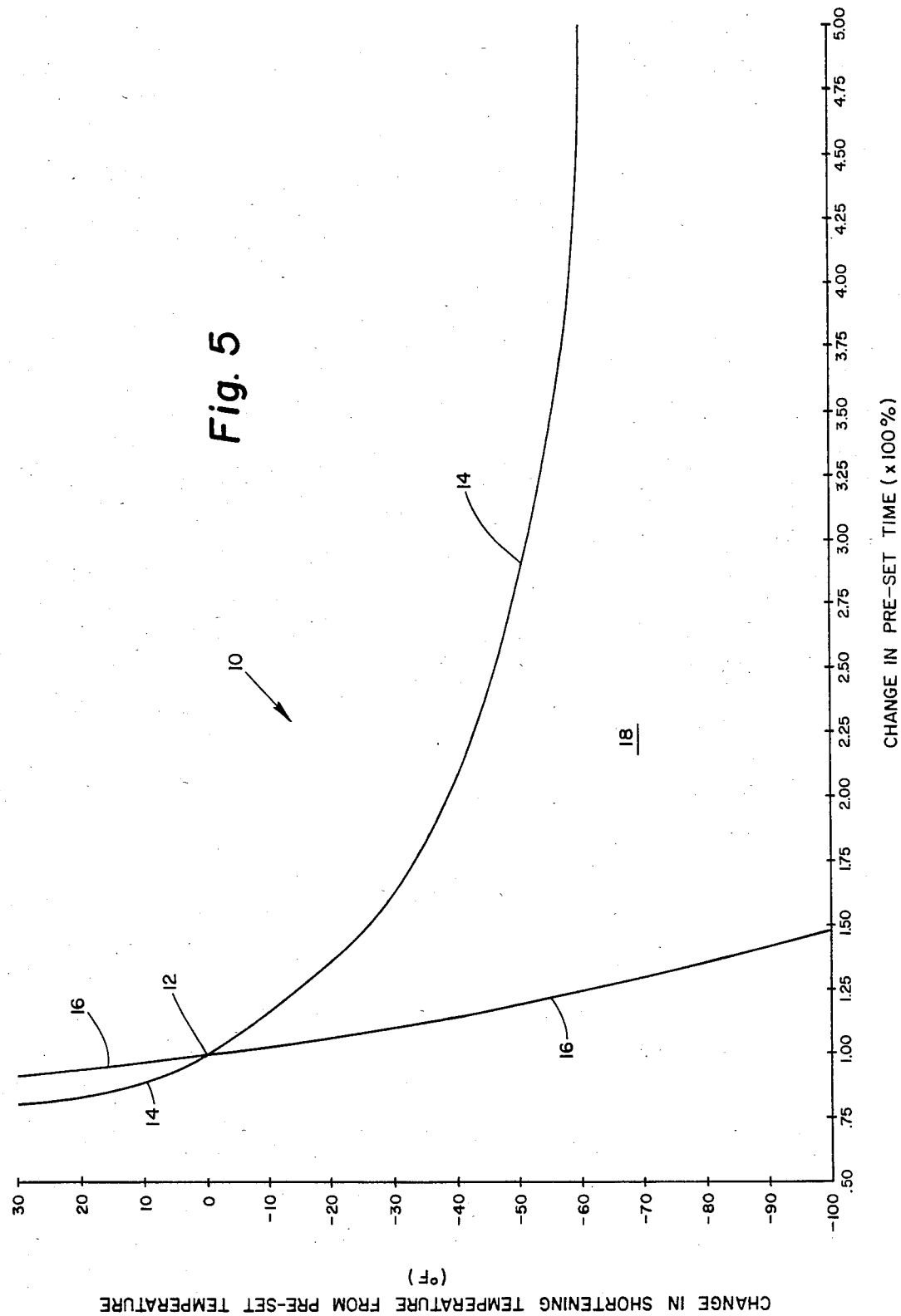

MICROCOMPUTER CONTROLLED COOKING TIMER AND METHOD

BACKGROUND OF THE INVENTION

The field of the invention relates to cooking timers and methods. In particular, the invention is a microcomputer controlled cooking timer and method of utility in the timing of deep fat frying cycles of a plurality of food items according to a presettable timing function at an operational temperature point based on an optimum frying temperature/time curve. The invention automatically senses the temperature of the cooking medium and compensates the timing function to the operational temperature point. A numerical display selectively indicates a countdown of the cooking cycle of at least one of the food items or the shortening temperature. A mode switch also allows for the testing of the fryer heat recovery time while an alternative embodiment can provide a quality control timing function to insure optimum food freshness and salability.

In the past, there have been disclosed various timing devices for use in conjunction with a deep fat frying operation. Earliest versions have included timers built around selectable RC time constants established by mechanically ganged switches applying preset potentiometers in conjunction with a capacitor to various discrete component gates such as a uni-junction transistor. Upon charging to a predetermined point, the gate would controllably operate subsequent circuitry, concluding the timing cycle. Subsequently, there have been disclosed other discrete component timers in which a selected RC time constant is supplied to an oscillator having as a further input the variable resistance of a thermistor probe. The oscillator's output signal, varying as a function of the time constant and sensed temperature, is subsequently applied to a counter for generation of a control signal incrementing to a predetermined count.

In all instances, only discrete component, hard wired, linear circuitry is employed. Selection of an RC timing constant associated with an individual food item to be timed is made by ganged-rotary, or push button switches. These switches have a finite life span and are subject to contamination. They are generally not independently operating, long-life switches. Further, an attendant, usually a younger person with relatively little training, has been accorded no indication of how far the timing cycle has progressed, and was thereby required to attentively watch the operation to an extent obviating the direction of his efforts elsewhere.

Importantly, the timing cycle which varied a preset timing operation according to actual shortening temperature only, was not compensated to adjust the temperature/time curve to a preset operational temperature point. In fact, no device has hitherto disclosed a presettable operational temperature point. Further, previous timers which have included a temperature probe have accorded the operator no provision for accurately indicating the actual shortening temperature. As a result, no provision for a test of fry pot recovery time has been possible for prior units not having accurate timing and temperature indicators.

Most significantly, no prior device has utilized state of the art microcomputer controlled operation having the accuracy and dependability of digital logic with the concomitant flexibility of programming functions such as a self check and auxiliary food product and quality control timing operations.

It would therefore be highly desirable to provide an improved cooking timer and method.

It would further be highly desirable to provide an improved cooking timer and method employing microcomputer controlled operation.

It would still further be highly desirable to provide an improved cooking timer and method allowing for the programming of self check and auxiliary food product and quality control timing.

It would still further be highly desirable to provide an improved cooking timer and method which utilizes independently operating long life switches.

It would still further be highly desirable to provide an improved cooking timer and method which compensates a food product temperature/time curve to a preset operational temperature point.

It would still further be highly desirable to provide an improved cooking timer and method which incorporates LCD displays.

It would still further be highly desirable to provide an improved cooking timer and method which decrementally displays the time remaining in a cooking cycle, thereby minimizing personal attention to a frying operation.

It would still further be highly desirable to provide an improved cooking timer and method which can selectively display the temperature of a cooking medium.

It would still further be highly desirable to provide an improved cooking timer and method which provides for an accurate test of fry pot recovery time.

It would finally be highly desirable to provide an improved cooking timer and method which can interface with automatic basket lifting equipment.

SUMMARY OF THE INVENTION

In the present invention a microcomputer and time base means combine to time and control the cooking of one or more food items. The cooking timer includes means for inputting to the microcomputer the recommended cooking time for a food item when cooking the item at a preselected or recommended cooking temperature and then comparing the actual temperature of the cooking medium with the recommended cooking temperature and adjusting the actual cooking time in accordance with a predetermined temperature/time relationship. The input of data to the microcomputer is through voltage to frequency converters and the output data is sent to an LCD display and to an audible signalling device. One or more product select switches are on the front of the unit and each switch accesses a separate channel of the microcomputer and for each product there are time controls provided for readily inputting to the microcomputer the recommended cooking time when cooked at a specific preselected temperature. Actuating a product select switch will actuate an indicator light directly above the switch and start the timing process. A temperature sensor in the cooking medium generates a signal which is proportional to temperature and which is fed into the temperature/time precondition circuit where it is compared with the recommended temperature. The actual cooking time is adjusted in accordance with a predetermined temperature/time relationship. The count time of the item being cooked is shown on the LCD display. On completion of the cooking cycle the indicator light above the product select switch flashes and an audible signal is sounded. The unit can control two items being cooked at the same time and in this event the LCD display will show only the count time for the food item nearest to completion. Additional microcomputer channels can be accessed for inputting predetermined quality control times and additional test modes of operation. The unit can also control one or more motor driven basket lift mechanisms for lifting the food item out of the cooking medium at the completion of the cooking cycle and a unique relay module is provided for switching the operation of the basket lift mechanism between the automatic and manual mode of operation. Finally, a unique method of timing and controlling the cooking cycle of one or more of food items has been developed and is herein disclosed.

It is therefore an object of the invention to provide an improved cooking timer and method.

It is further an object of the invention to provide an improved cooking timer and method employing microcomputer controlled operation.

It is still further an object of the invention to provide an improved cooking timer and method allowing for the programming of self-check, auxiliary food product and quality control timing.

It is still further an object of the invention to provide an improved cooking timer and method which utilizes independently operating, long life switches.

It is still further an object of the invention to provide an improved cooking timer and method which compensates a food product temperature/time curve to a preset operational temperature point.

It is still further an object of the invention to provide an improved cooking timer and method which incorporates LCD displays.

It is still further an object of the invention to provide an improved cooking timer and method which decrementally displays the time remaining in a cooking cycle, thereby minimizing personal attention to a frying operation.

It is still further an object of the invention to provide an improved cooking timer and method which can selectively display the temperature of a cooking medium.

It is still further an object of the invention to provide an improved cooking timer and method which provides for an accurate test of fry pot recovery time.

It is still further an object of the invention to provide an improved cooking timer and method which can interface with automatic basket lifting equipment.

It is finally an object of the invention to provide an improved cooking timer and method fulfilling all of the objects hereinbefore specified.

BRIEF DESCRIPTION OF THE DRAWINGS

The above-mentioned and other features and objects of the invention and the manner of attaining them will become more apparent and the invention itself will be best understood by reference to the following description of an embodiment of the invention taken in conjunction with the accompanying drawings, wherein:

FIGS. 3, 3A, 3B, and 3C are schematic diagrams illustrating the electronic circuitry of the cooking timer shown in FIGS. 1 and 2;

FIG. 4 is a schematic of the switching relay and the actuating relays for controlling the basket lift motors;

FIG. 5 is a graph indicating a representative range for a family of curves that can be generated by the temperature/time preconditioned circuit of the present invention.

DESCRIPTION OF A PREFERRED EMBODIMENT

Figure 1:
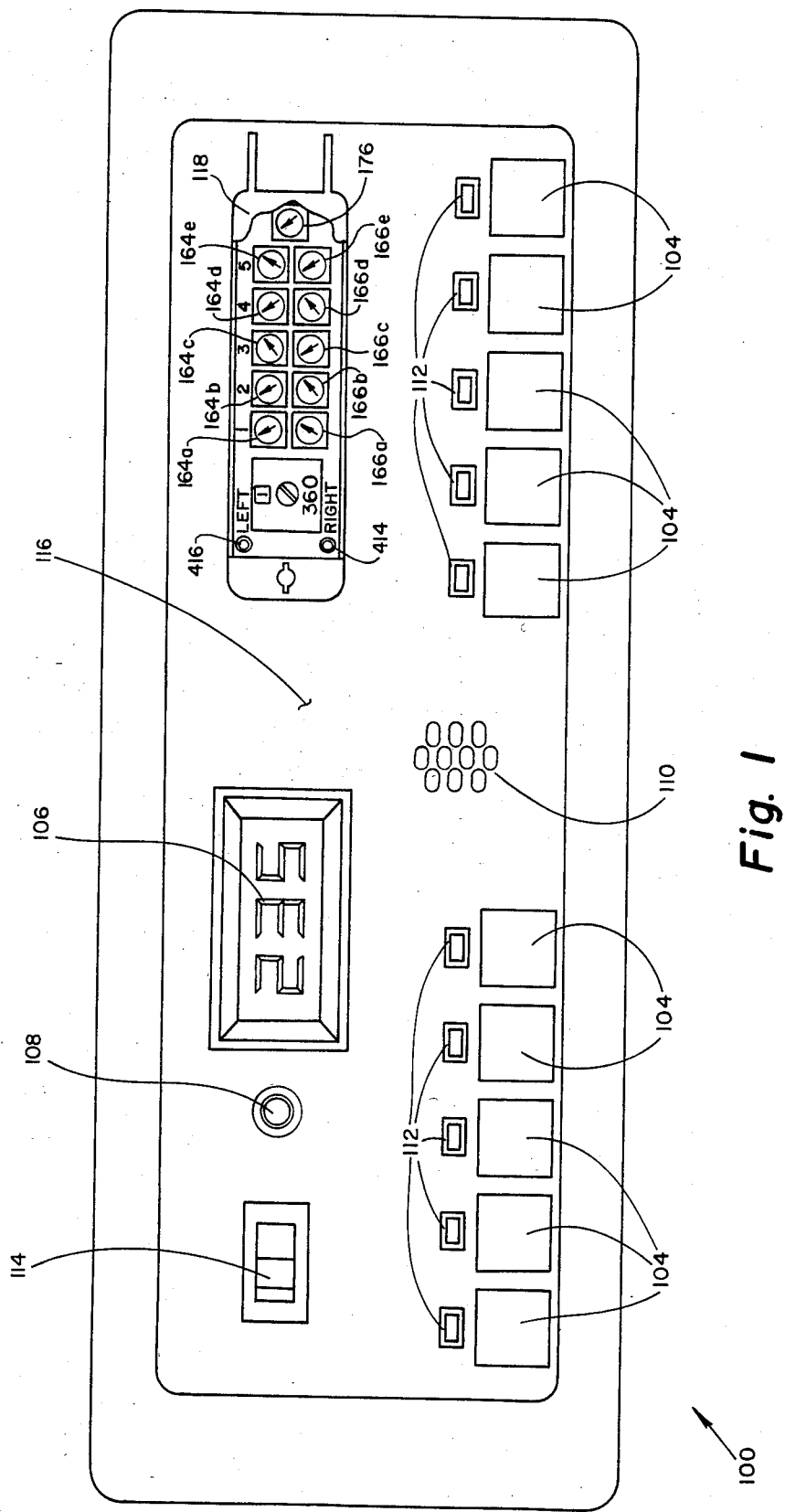
FIG. 1 is a front plan view of an escutcheon for use with an embodiment of the cooking timer illustrating the product select switches, indicators and LCD display and having the access cover partially cut-away to illustrate the mode switch, temperature preset and timing set circuit potentiometers.

Referring now to FIG. 1, the mechanical structure of the cooking timer 100 is shown. In pertinent part, cooking timer 100 presents an escutcheon which allows an operator to monitor and direct the operation of the device. Physically, escutcheon 116 may be conveniently constructed of stainless steel or other rigid structural material suitable for use in a kitchen environment and the cooking timer 100 may be adapted for use as either a built in or free standing unit.

Power to cooking timer 100 is controlled by means of on/off switch 114. Input power to the device may conveniently be supplied as 120 volt AC current at a frequency of 60 hertz appropriately stepped down, rectified and regulated for use with the electronic circuitry of FIGS. 3 and 4.

Access cover 118, which serves to preclude tampering with preset inputs to cooking timer 100, is hingedly interconnected to escutcheon 116 and held in place by means of a set screw (now shown). Opening of access cover 118 allows an operator to control the setting of timing set circuit 160, temp preset potentiometer 176 and mode switch 360 as shall be more fully described hereinbelow.

Referring now to FIGS. 2 and 3, 3A, 3B, and 3C, the microcomputer 102 and its associated input and output hardware is illustrated. In the embodiment shown, microcomputer 102 comprises a Mostek F8 family microcomputer designation number MK3870. The MK3870 features 2048 bytes of ROM, 64 bytes of scratch pad RAM, a programmable binary timer, 32 bits of I/0, and a single, positive 5 volt power supply requirement. While the microcomputer 102 of the cooking timer 100 comprises the unit as above described, it should also be obvious to one skilled in the art that similar microcomputer devices might be utilized and substituted therefor.

The time base for microcomputer 102 is established by means of crystal 138 connected to the XTL$_1$ and XTL$_2$ inputs. In the embodiments shown, crystal 138 may be specified as a four megahertz unit. The active low, external reset to microcomputer 102 on reset line 356 is held high through resistor 358.

An operator selects a cooking cycle corresponding to a given food item by the momentary depression of any of the product select switches 104 of cooking timer 100. In the embodiment illustrated, a left and right hand channel is configured wherein each channel has five corresponding set cooking cycles as determined by timing set circuit 160 which shall be more fully described hereinbelow. Electrical information as to the depression of any of the product select switches 104 is input to microcomputer 102 on product select bus 126. Product select bus 126 is a bi-directional bus allowing input to and output from microcomputer 102.

Upon depression of a single one of product select switches 104, a corresponding one of indicators 112 is illuminated by means of an associated one of switching transistors 128 having its emitter lead coupled to the corresponding one of indicators 112 through a single one of resistors 312. The respective one of indicators 112 corresponding to each one of product select switches 104 is located in proximity thereto as illustrated in FIG. 1 thereby giving a visual indication of the cooking cycle selected. In practice, the product select switches 104 may be labeled with the name of an appropriate food item requiring a preset cooking cycle.

After receiving input of a selected cooking cycle on one of the product select switches 104, microcomputer 102 thereafter generates an appropriate control signal on control lines 140, 142 and 144. The control signals on control lines 140, 142 and 144 are respectively inverted through inverters 146, 148 and 150 for input to analog multiplexer 158 on "A" line 152, "B" line 154 and "C" line 156 respectively. The varying signal levels on these lines are selectively coupled as the inputs to multiplexer 158 to common out/in line 318 for subsequent input to voltage-to-frequency converter circuitry 314 as shall be more fully described hereinbelow.

Timing set circuit 160 comprises a plurality of voltage divider networks 162A, 162B, 162C, 162D and 162E. Coarse adjustment potentiometers 164A, 164B, 164C, 164D and 164E allow a coarse adjustment of timing set circuit 160. Fine adjustment potentiometers 166A, 166B, 166C, 166D and 166E allow a fine adjustment of a timing set for a cooking cycle. The coarse and fine adjustment of timing set circuit 160 is accomplished by removing access cover 118 of escutcheon 116 as shown in FIG. 1.

The wiper contact of coarse adjustment potentiometers 164A, 164B, 164C, 164D and 164E selectively apply a sensed voltage level of timing set circuit 160 to the inputs of multiplexer 158. The remaining inputs to multiplexer 158 shall be more fully described hereinbelow.

Depending on the respective signals on "A" line 152, "B" line 154 and "C" line 156 an input to multiplexer 158 is applied to common out/in line 318. Common out/in line 318 is supplied to the noninverting input of operational amplifier 316 of voltage-to-frequency converter circuitry 314. The inverting input 322 of operational amplifier 316 is connected to circuit ground through resistor 328 and 326. The output 320 of operational amplifier 316 is supplied to one input of voltage-to-frequency converter 315. Output 320 is further coupled to inverting input 322 through capacitor 324, which input 322 is also connected to another input of voltage-to-frequency converter 315. A voltage potential established by a voltage divider network comprising resistors 334 and 336 is further input to voltage-to-frequency converter 315. A positive voltage potential is additionally supplied as input to voltage-to-frequency converter 315 through a low pass filter network including resistor 340 and capacitor 338. A final input to voltage-to-frequency converter 315 is established by means of an adjustable voltage divider 332.

Output of voltage-to-frequency converter circuitry 314 appears on output line 342 of voltage-to-frequency converter 315 for direct input to microcomputer 102. Output line 342 is additionally coupled through diodes 346 and 344 to temp/time precondition line 438. Diode 346 is additionally coupled through resistor 348 to the base lead of transistor 350. The collector of transistor 350 is pulled up through resistor 352 for input to microcomputer 102 on external interrupt line 354, the active state of which is determined by the microcomputer 102 programming.

The temperature of the cooking medium is sensed by means of Platinum transducer or RTD 120, which is physically disposed within the cooking medium. In the Mode "4" position of mode switch 360, which shall be more fully described hereinbelow, the output of Platinum RTD 120 on mode switch lead 122 and temp line 124 is applied to the collector of transistor 188 in temperature circuit 178. Generation of a voltage signal varying proportionately to the sensed temperature through Platinum RTD 120 is accomplished by means of operational amplifier 182 which has its output directly connected to the base of transistor 188. A preset voltage level is established at the noninverting input 184 of operational amplifier 182 by means of voltage divider network 170 with a parallel connected capacitor 172. A positive voltage potential is applied to the emitter of transistor 188 and the inverting input 186 of operational amplifier 182 through resistor 190. The temperature variable resistance of Platinum RTD 120 connects the collector lead of transistor 188 to circuit ground along with parallel connected capacitor 192. A voltage signal varying as a function of the cooking medium temperature is supplied to the noninverting input 198 of buffer 200 across resistor 196 through resistor 194. The inverting input 204 of buffer 200 is held at a preset voltage potential by means of voltage divider 202 as coupled through resistor 206. The output of buffer 200 is fed back to the inverting input 204 through feed back resistor 208 as well as being applied to noninverting input 210 of operational amplifier 218. The inverting input 224 is connected to circuit ground through resistor 226 while the output on oil temp line 220 is fed back through feed back resistor 222. Oil temp line 220 is furnished as input to multiplexer 158 as well as temp/time curve preconditioned circuit 180.

Voltage information corresponding to the sensed temperature of the cooking medium is supplied through resistor 244 to the inverting input 246 of inverting amplifier 248. The output line 250 of inverting amplifier 248 is fed back to the inverting input 246 through feed back resistor 252. The noninverting inputs 254 of inverting amps 248 and 249 are held at a positive voltage potential established by a voltage divider network formed by resistors 256 and 258. Output line 250 from inverting amplfier 248 is furnished as input to voltage-to-frequency converter 300 through a low pass filter network comprising resistor 294 and capacitor 296. Additionally, output line 250 is connected to the noninverting input 278 of low temp comparator 276 shown at the bottom of FIG. 3C.

Temp preset potentiometer 176, also accessible through access cover 118 as shown in FIG. 1, allows the cooking timer 100 to be calibrated to match the cooking temperature specified by a food manufacturer. Voltage information indicative of the preset temperature to be set is determined by a voltage divider network comprising resistor 240, temp preset potentiometer 176 and resistor 242. As seen at the top of FIG. 3C, the wiper contact of temp preset potentiometer 176 is connected to temp preset line 174 for input to analog multiplexer 158. As seen in lower portion of FIG. 3B the temperature preset line 174 is also presented as input to inverting input 260 of inverting amp 249 through resistor 270. Additionally, inverting amplifier 249 has as input, at inverting input 260, a voltage determined by a voltage divider network comprising resistors 266 and 268 in conjunction with potentiometer 264. The output of inverting amp 249 on output line 272 is fed back to the inverting input 260 through feed back resistor 274. Additionally, output line 272 is supplied as input to voltage-to-frequency converter 300 through a low pass filter network formed by resistor 298 in conjunction with capacitor 302.

Additional inputs to voltage-to-frequency converter 300 are furnished through another low pass filter network formed by resistor 306 and capacitor 308. Adjustable voltage divider 304 supplies a final input to voltage-to-frequency converter 300. The output of temp-/time curve precondition circuit 180 appears on temp-/time precondition line 438 for direct input to microcomputer 102.

Indications of a cooking medium temperature exceeding a predetermined operating temperature or falling significantly below that operating temperature are generated by means of high temp comparator 228 and low temp comparator 276 shown in the lower center of FIG. 3C. High temp comparator 228 receives as input to its noninverting input 232 oil temp line 220, electrically connected through resistor 230. The output on high output line 236 is fed back to the noninverting input 232 through feed back resistor 234. The inverting input 238 is set at a reference level which corresponds to the high temperature threshold point and is determined by the setting of potentiometer 214 in conjunction with the voltage divider network formed by resistors 212 and 216. The high temperature threshold could be set at a range of temperatures by adjustment of potentiometer 214, however the current actual practice is to set the threshold at a point corresponding to a cooking medium temperature of approximately 395° F., such that an oil temperature exceeding that appearing on oil temp line 220 will cause an inhibit signal to be input to microcomputer 102 on high temp inhibit line 436 by means of transistor 286 in conjunction with the base resistor 288.

Low temp comparator 276 has as input to its inverting input the output of inverting amp 249 on output line 272. Further, the output of inverting amp 248 on output line 250 is applied to the noninverting input 278 of low temp comparator 276 through resistor 280. The output of low temp comparator 276 appearing on low output line 282 is further fed back to the noninverting input 278 through feed back resistor 284. In like manner to the circuitry associated with high temp comparator 228, an inhibit signal on low temp inhibit line 434 is directly input to microcomputer 102 by means of low temp comparator 276 operating in conjunction with transistor 290 and base resistor 292.

Figure 2:
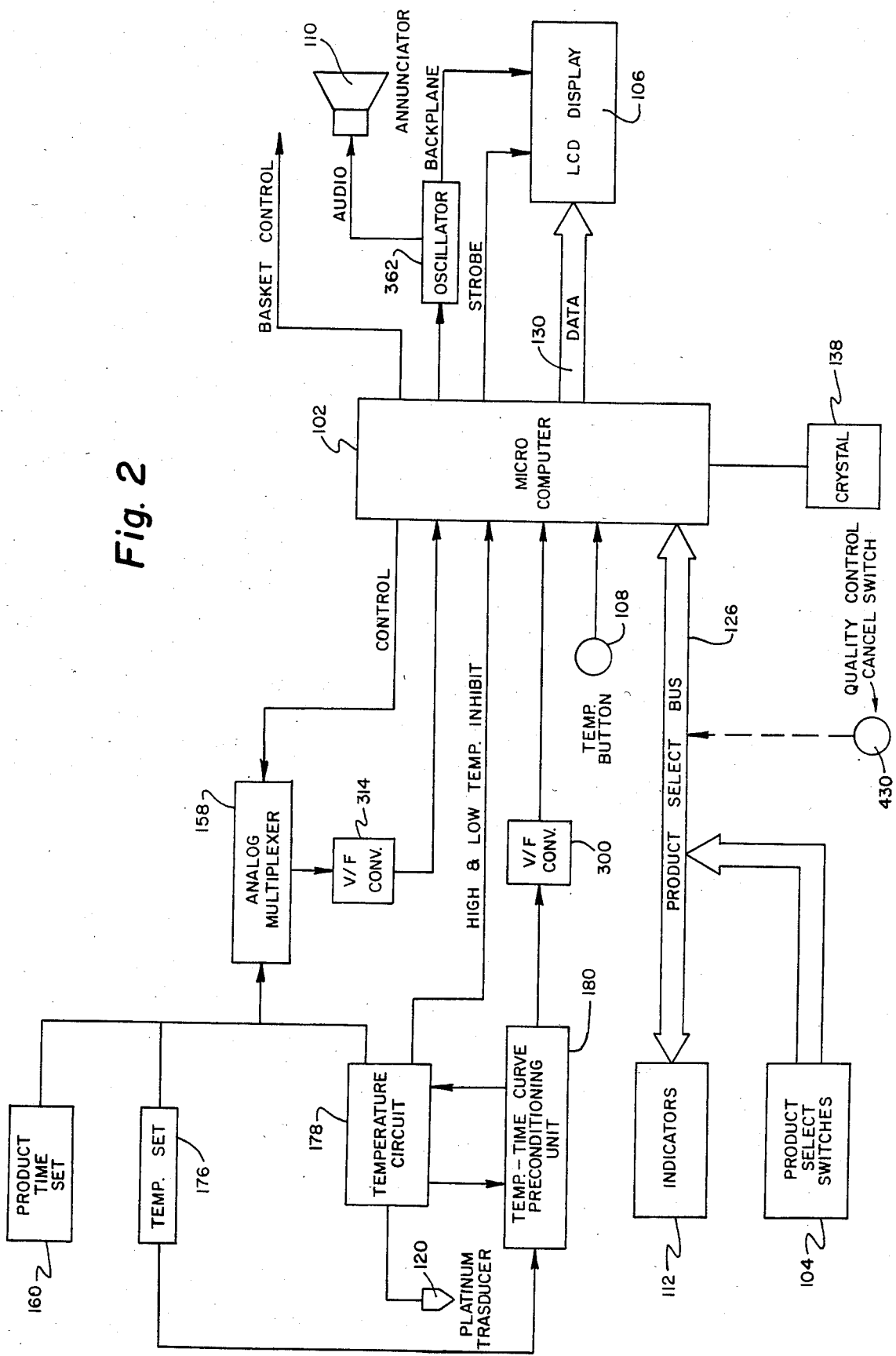
FIG. 2 is a logic flow diagram illustrating the major subsystems and their interrelation to the microcomputer in a specific embodiment of the invention.
Figure 3:
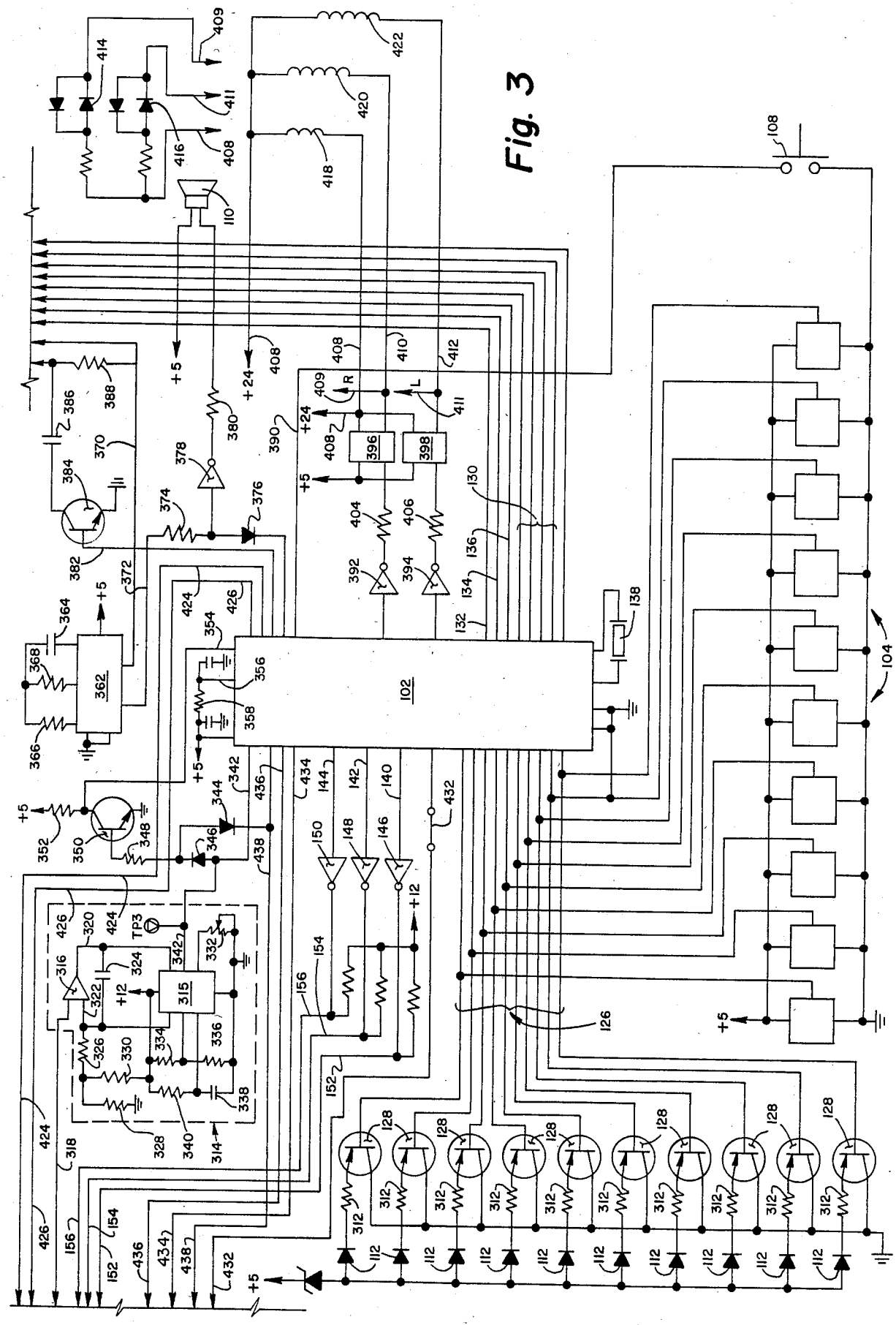
Figure 3B:
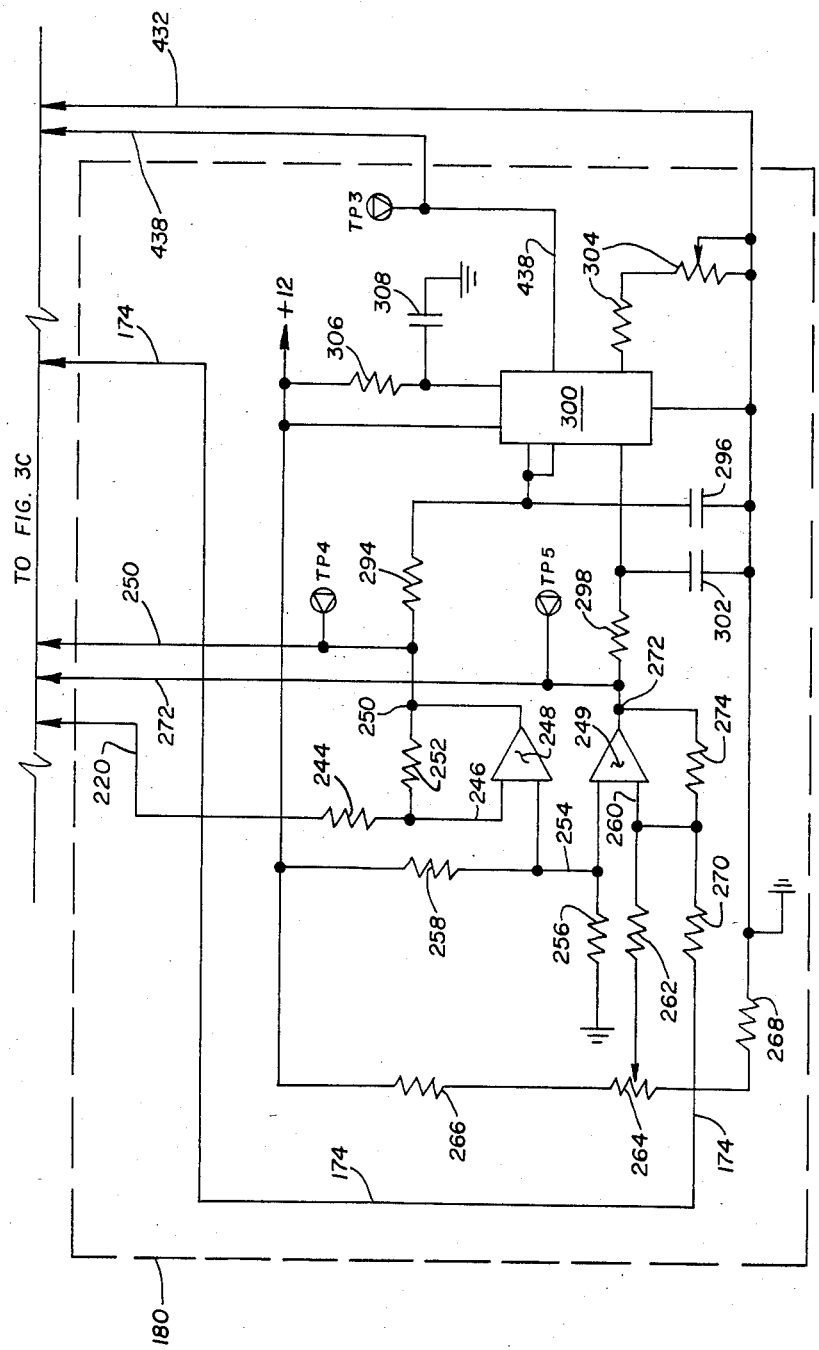
Figure 3C:
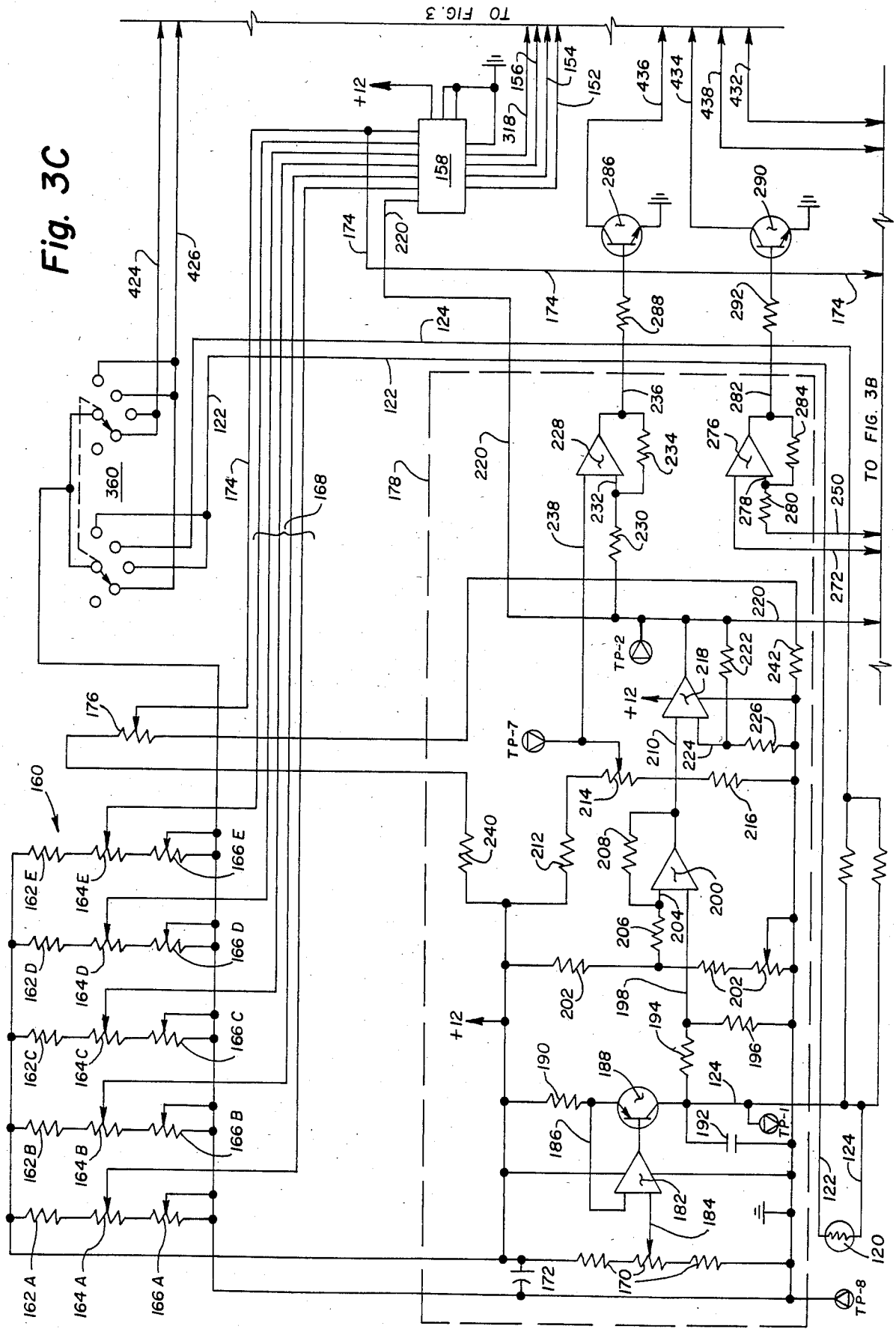

As seen in FIGS. 2, 3 and 3A, output from microcomputer 102 appears on BCD data bus 130 for input to BCD to seven segment decoder/drivers 402 for input to individual LCD displays 400 which form LCD display 106. Strobe inputs to BCD to seven segment decoder/drivers 402 are provided by output of microcomputer 102 on strobe MSD line 132, strobe second line 134 and strobe LSD line 136.

As seen in the top center of FIG. 3 oscillator 362 providing frequency output determined by capacitor 364 in conjunction with resistors 366 and 368 supplies back plane oscillation to LCD displays 400 on back plane line 370. A control output of microcomputer 102 on decimal point control line 382 operating in conjunction with transistor 384, capacitor 386 and resistor 388 provides a means to selectively illuminate or eliminate display of a decimal point in the least significant digit portion of LCD display 106 via line 371.

A further, audio frequency output of oscillator 362 appears on audio line 372 for input through resistor 374, inverter 378 and series resistor 380 for producing an audio tone through annunciator 110. The audible production of a tone through annunciator 110 is controlled by microcomputer 102 through diode 376.

In addition to audible and visual signals indicating the completion of a given cooking cycle, microcomputer 102 also furnishes control outputs to operate automatic basket lifting devices. Microcomputer 102 provides input through inverters 392 and 394 to respective series resistors 404 and 406 for input to basket controllers 396 and 398 respectively. A control signal appearing simultaneously at parallel connected basket controllers 396 and 398 causes a signal to appear on auto/manual control line 408 for energizing of auto/manual relay coil 418. A single control signal appearing at basket controller 396 operates right basket relay coil 420 as connected to right basket control line 410. Similarly, basket controller 398 operates left basket relay coil 422 by means of left basket control line 412. Right basket indicator 414 and left basket indicator 416 illuminate upon appearance of a control signal on right basket control line 410 and left basket control line 412 respectively. Right basket indicator 414 and left basket indicator 416 are viewable upon removal of access cover 118 as shown in FIG. 1.

FIG. 4 is a detailed drawing of the relay module that actuates the basket lifting mechanisms and which module is uniquely designed to include an automatic disconnect feature whereby if a problem occurs within the computer or it is desired to operate the basket lifts independent of the computer, then turning the computer power switch off will transfer control of the basket lifts to the original fryer controls. Typically, the microcomputer controlled cooking timer of the present invention is used in conjunction with a manual frying unit having front panel controls which control the operation of the basket lifting mechanisms. The front panel controls have heretofore been disconnected when the cooking timer has been used such that it was necessary to manually reconnect the front panel controls if there were any problems with the computer controlled timing unit. With the present design a relay module box 500 is provided containing a 4 pole relay coil 418 and two 2 pole relay coils 420, 422 which have been described above. Relay 420 controls the right basket lift motor and relay 422 operates the left basket lift motor. The lines 410, 412, extend from the basket controllers 396, 398, respectively and are actuated to operate basket lifting motors. Auto/manual control line 408 extends from basket controllers 396 and 398 and connects to a source of 24 VAC.

FIG. 4 shows all three relays in their normally closed or deactivated position and show the lines 524, 526, 528, 530 extending from the front panel controls and being coupled, through relay 418 to lines 544, 546, 548, 550 respectively. In this position operation of the fryer can be controlled with the front panel controls. Upon activating the power source for the computer controlled timing unit the 4 pole relay 418 is energized and thereby switches control of the fry pan lift motors to the two control relays 420, 422 which are, in turn, activated by signals on line 410 or 412. Actuation of the left basket lift motor is accomplished by energizing relay 422. Relay 420 is energized when the right basket lift motor is to be activated. Turning off the computer power source automatically deactivates the relays and control is switched to the front panel controls as indicated above.

FIG. 5 shows a graph of the change in shortening from the preset temperature versus the change in preset time and shows two representative curves 14, 16 which pass through the preset point 12. The curves exhibit the changes in cooking time which occur with changes in shortening temperature. The specific relationship between the changes in shortening time versus preset time (i.e. the shape of the curve) is determined by the voltage offset between test point TP4 and TP5 and is calibrated into the time-temperature precondition unit by potentiometer 264 which is typically adjusted during production and the preset temperature which is set by operating personnel adjusting potentiometer 176. The curve 14 represents a voltage offset of 1.0 volts and curve 16 represents a voltage offset of 3.6 volts and any number of a family of curves can be obtained in area 18 between these two curves. It will be seen that if the actual shortening temperature is below the preset shortening temperature, then the circuit will determine the actual cooking time by taking the preset time and multiplying it by change in preset time factor that is determined by the specific time-temperature relationship (i.e. FIG. 5) which has been calibrated into preconditioning unit 180.

While in normal operation, LCD display 106 will decrementally indicate the remaining portion of a cooking cyle for a given food item, momentary depression of temp button 108 causes a reading of the sensed temperature of a cooking medium to appear instead on LCD display 106.

In the Mode "4" or "Fry" Mode of operation, with the specific embodiment above described, depressing any of the product select switches 104, on either the right or left channel, initiates the preset cooking cycle for that product and activates the appropriate one of indicators 112 above the selected switch. The microcomputer 102 monitors the cooking medium temperature and compensates the preset cooking time established by timing set circuit 160 in accordance with the preset time versus temperature curve to give the desired cooking cycle. At the end of the cooking cycle, the illuminated one of indicators 112 above the corresponding one of the product select switches 104 will flash and a pulsing audible alert will sound through annunciator 110. The audible alert and flashing light will cancel by depressing the previously selected one of the product select switches 104. Throughout the cooking cycle, LCD display 106 will display the approximate time remaining of the cooking cycle nearest completion. Depressing temp button 108 will cause the cooking medium temperature to be displayed in degrees Fahrenheit on LCD display 106. The cooking cycle is inhibited when microcomputer 102 senses a shortening temperature that is too high or too low, and an audible alert through annunciator 110 will sound when the cooking medium temperature is too high. Additionally, LCD display 106 will also appropriately display an indication of "HI" or "LO".

According to the setting of mode switch 360 as input to microcomputer 102 on mode lines 424 and 426, the cooking timer 100 will operate in the following five modes:

Mode "0", the preset time mode, the cooking cycle is inhibited. Depressing any of the product select switches 104 will display the respective nominal preset cooking time on LCD display 106. The preset time established by timing set circuit 160 can be changed by adjusting any of coarse adjustment potentiometers 164A through 164E in conjunction with fine adjustment potentiometers 166A through 166E.

Mode "1", the preset temperature mode, the cooking cycle is inhibited. The LCD display 106 will display the nominal cooking temperature. The nominal cooking temperature is set by means of temp preset potentiometer 176.

Mode "2", the recovery time mode, the cooking cycle is inhibited. The LCD display 106 will display the cooking medium temperature. When the cooking medium temperature is equal to 275° F., the recovery test timer will automatically be initiated. The time and temperature will alternately be displayed on LCD display 106. When the cooking medium temperature is equal to 325° F., the recovery test timer will stop and an audible alert will sound through annunciator 110. The elapsed time of recovery will be displayed alternately with the cooking medium temperature on LCD display 106.

Mode "3", the test mode, the microcomputer 102 operates as previously described in the microcomputer 102 Mode "4" operation except that a constant temperature is simulated and the Platinum RTD 120 signal is disregarded. This causes microcomputer 102 to act as a countdown timer without temperature/time compensation. The LCD display 106 will display the time remaining in seconds. The test mode may also be used to verify proper Platinum RTD 120 and LCD display 106 operation.

Mode "4", the fry mode, the cooking timer 100 operates as defined in the microcomputer 102 Mode "4" operation above.

Figure 6:
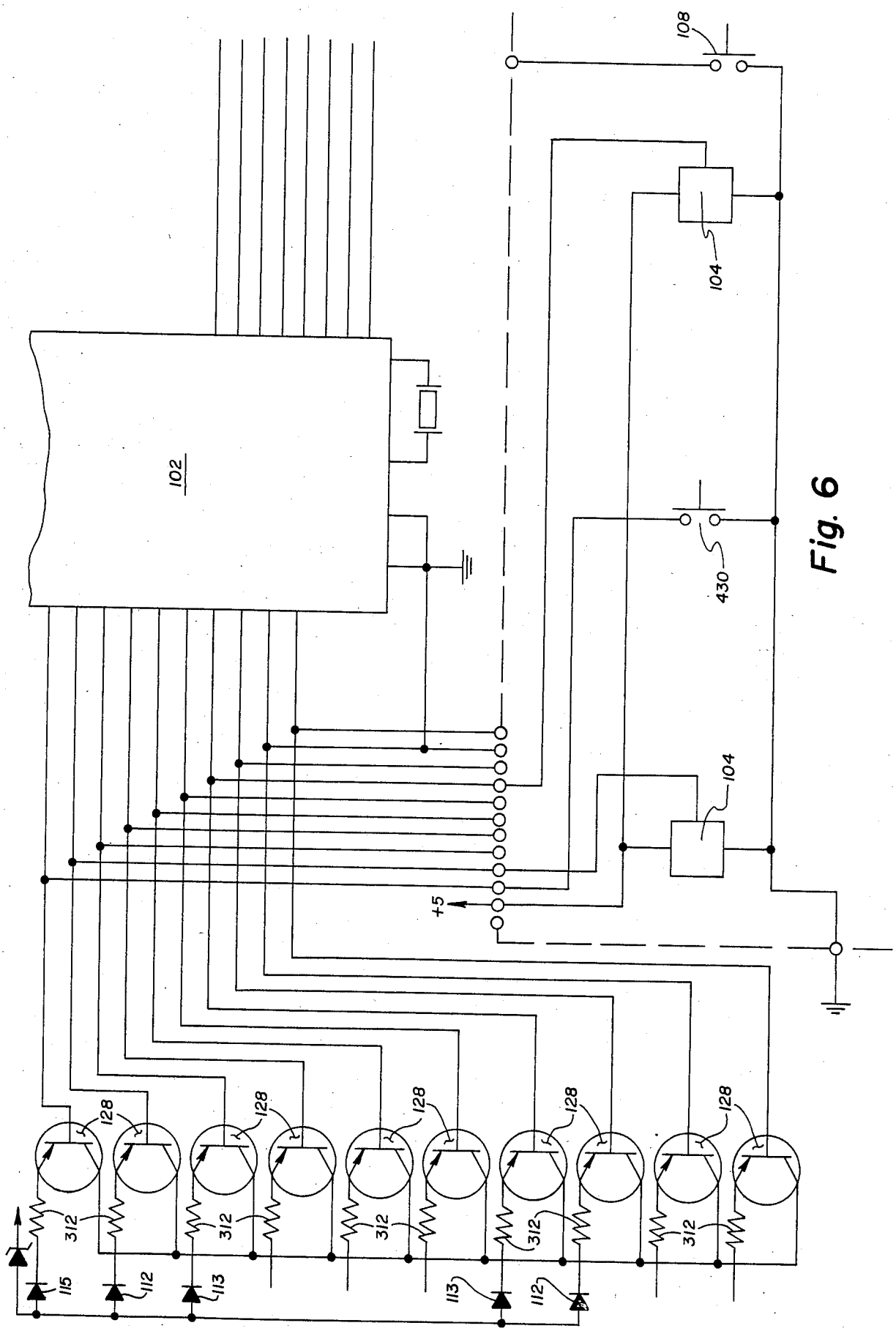
FIG. 6 is a partial schematic diagram of the product select switches and indicators for use in an alternative embodiment in conjunction with the electronic circuitry of FIGS. 3, 3A, 3B, and 3C.

Referring now to FIGS. 2, 3 and 6, an alternative embodiment of the cooking timer 100 is shown utilizing but two product select switches 104. Additionally, a quality control cancel switch 430 has been added. The program of microcomputer 102 may be controlled to alter the operation of cooking timer 100 as previously described depending on the connection of an input to microcomputer 102 to ground through program select jumper 432.

With the control circuitry of FIG. 6, depressing either of the product select switches 104 initiates the preset cooking cycle for that product, and activates the appropriate one of indicators 112 above the switch. The microcomputer 102 monitors the cooking medium temperature and compensates the preset cooking time as set by timing set circuit 160, in accordance with the preset time versus temperature curve, to give the desired cooking cycle. At the end of the cooking cycle, the illuminated one of indicators 112 above the selected one of the product select switches 104 will flash and a pulsing audible alert will sound through annunciator 110. The audible alert and flashing light will cancel by depressing the previously selected one of the product select switches 104. An auxiliary function timer is activated at the start of a cooking cycle by depression of either of the product select switches 104. At the end of the auxiliary function preset time, the selected one of the auxiliary function indicators 113 will flash and an audible alert will sound for approximately four seconds through annunciator 110 and then stop. During a cooking cycle, a three digit LCD display 106 will display the approximate time remaining of the timing cycle nearest completion.

Depressing temp button 108 will cause the cooking medium temperature to be displayed in degrees Fahrenheit on LCD display 106. At the completion of the last cooking cycle, the quality control timer is initiated. The quality control time remaining will be displayed on LCD display 106. At the completion of the quality control time, the quality control indicator 115 will flash and a pulsing audible alert will sound through annunciator 110. The audible alert and light will be deactivated by depressing quality control cancel switch 430. If during the quality control timing, a cooking cycle is initiated, the quality control timer will reset. Depressing quality control cancel switch 430 during quality control timing will not cancel the timing cycle. The alternative embodiment of the cooking timer 100 illustrated in FIGS. 2, 3 and 6 will operate according to the modes previously specified with the following exception:

Mode "0" preset time—The preset time can be changed by adjusting the timing set circuit 160. Depressing quality control cancel switch 430 will display the preset quality control time on LCD display 106. The preset quality control time can be changed by adjusting the corresponding portion of timing set circuit 160.

What is provided therefore is an improved cooking timer and method employing microcomputer controlled operation allowing for the programming of a self-check an auxiliary food product and quality control timing. Also provided is an improved cooking timer and method which utilizes independently operating long life switches and compensates a food product temperature/time curve to a preset operational temperature point. The cooking timer of the invention additionally provides an LCD display which decrementally displays the time remaining in a cooking cycle operation thereby minimizing personal attention to the frying operation. The invention further provides a cooking timer which can selectably display the temperature of a cooking medium and provide for an accurate test of fry pot recovery time and can readily interface with automatic basket lifting equipment to further minimize attended operation.

While there have been described above the principles of this invention in conjunction with specific apparatus, it is to be clearly understood that this description is made only by way of example and not as a limitation to the scope of the invention.

What is claimed is:

1. An apparatus for timing and controlling the cooking cycle of a food item according to a predetermined optimum temperature/time curve and at a preset operational temperature comprising:
   a temperature sensor for sensing the actual temperature of a cooking medium,
   an adjustable temperature preset means for generating an electrical signal which represents the recommended preset operational temperature of the cooking medium when cooking the food item,
   an adjustable timing circuit means for presetting the cooking time cycle of the food item when cooked in the cooking medium at the preset operational temperature,
   a temperature circuit electrically connected to said temperature sensor for developing a first output signal corresponding to the sensed actual temperature of the medium,
   a temperature/time curve preconditioning circuit electrically connected to said temperature circuit and said adjustable temperature preset means for developing a second output signal proportional to said first output signal but compensated for any difference between the actual sensed temperature and the preset operational temperature,
   a microcomputer,
   a time base means electrically coupled to said microcomputer for inputting base time data into said microcomputer,
   said microcomputer electrically receiving information from said adjustable timing circuit means and the first and second output signals and computing output data indicative of the sensed temperature and the time countdown for the cooking time cycle of the food item, the timing countdown data of the cooking time cycle having been adjusted by said microcomputer for any difference between the actual temperature of the cooking medium and the preset operational temperature, and
   said microcomputer also generating a control signal at the completion of the cooking cycle of the food item.

2. The apparatus defined in claim 1 which further comprises:
   a first voltage-to-frequency converter electrically connected between said temperature/time curve preconditioning circuit and said microcomputer for inputting said second output signal into said microcomputer,
   an analog multiplexer electrically coupled to said adjustable temperature preset means, said adjustable timing circuit means, and said temperature circuit,
   a second voltage-to-frequency converter electrically connected between said analog multiplexer and said microcomputer for inputting data into said microcomputer,
   said analog multiplexer being controlled by said microcomputer whereby the said first output signal corresponding to the sensed temperature is inputted to said microcomputer.

3. The apparatus defined in claim 1 wherein said temperature/time preconditioning circuit further comprises:
   an adjustable voltage divider network for adjusting the interrelationship between the changes in cooking time which results from the differences between the preset cooking temperature and the actual temperature of the cooking medium.

4. The apparatus defined in claim 1 further comprising a high temperature inhibit circuit means electrically connected to said temperature circuit, said high temperature inhibit circuit means comprising:
   a means for generating a presettable high temperature reference signal,
   a comparator for comparing the reference signal with the sensed temperature and
   means for generating an inhibit signal when the sensed temperature of said medium is greater than the high temperature reference signal.

5. The apparatus defined in claim 4 wherein said microcomputer inhibits the timing countdown of any then operating cooking cycle in response to said high temperature inhibit signal and further actuates said indicator means as a warning signal.

6. The apparatus defined in claim 1 which further comprises:
an electrical actuating means coupled to the output of said microcomputer for use in mechanically removing the food item from the cooking medium upon the completion of the cooking time cycle,
said electrical actuating means being actuated by said control signal generated at the completion of the cooking cycle.

7. The apparatus defined in claim 6 wherein said electrical actuating means comprises:
a basket control relay for controlling the operation of a motor driven basket lift mechanism and
an auto/manual relay electrically interconnected with said basket control relay and actuated by an auto/manual line which controls the operation of said apparatus between an automatic mode and manual mode.

8. The apparatus described in claim 1 which further comprises:
a visual display means and an indicator means electrically connected to the output of said microcomputer,
said visual display means indicating the time countdown data of the cooking cycle, and
said indicator means giving sensory indication in response to said control signal generated at the completion of the cooking cycle.

9. The apparatus described in claim 8 wherein said visual display means comprises:
LCD display means,
seven segment decorder/drivers electrically coupled to said LCD display means and to said microcomputer whereby the output data from said microcomputer is displayed on said LCD displays.

10. The apparatus defined in claim 8 which further comprises a temperature display switch electrically coupled to said microcomputer whereby the momentary actuation of said temperature display switch will result in said microcomputer interrupting the display of the timing countdown data on said display means and will display the actual sensed temperature of the cooking medium and after releasing the temperature display switch the timing countdown will again be shown on said display means.

11. The apparatus defined in claim 8 further comprising a low temperature inhibit circuit means electrically connected to said temperature/time curve preconditioning circuit, said low temperature inhibit circuit means comprising,
a means for generating a presettable low temperature reference signal,
a comparator for comparing the reference signal with the sensed temperature and
means for generating an inhibit signal when the sensed temperature of said medium is lower than the low temperature reference signal.

12. The apparatus defined in claim 11 wherein said microcomputer inhibits the timing countdown of any then operating cooking cycle in response to said low temperature inhibit signal and further prevents the initiation of a new cooking cycle.

13. An apparatus for timing and controlling the cooking cycles of any of a plurality of food items according to a predetermined optimum temperature/time curve and at a preset operational temperature comprising:
a temperature sensor for sensing the actual temperature of a cooking medium,
an adjustable temperature preset means for generating an electrical signal which represents the recommended preset operational temperature of the cooking medium during preparation of any of the plurality of food items,
adjustable timing circuit means for presetting the cooking time cycle for each of the plurality of food items when cooked at the preset operational temperature,
a temperature circuit electrically connected to said temperature sensor for developing a first output signal corresponding to the sensed temperature of the medium,
a temperature/time curve preconditioning circuit electrically connected to said temperature circuit and said adjustable temperature preset means for developing a second output signal proportional to said first output signal but compensated for any difference between the actual sensed temperature and the preset operational temperature,
a microcomputer,
a time base means electrically coupled to said microcomputer for inputting base time data into said microcomputer,
said microcomputer electrically receiving information from said adjustable timing circuit means and the first and second output signals for computing output data indicative of the sensed temperature and the time countdown for the cooking time cycle of the food item selected, said cooking time cycle having been adjusted by said microcomputer for any differences between the actual temperature of the cooking medium and the preset operational temperature,
said microcomputer also generating a control signal at the completion of the cooking cycle for the food item selected.

14. The apparatus defined in claim 13 which further comprises:
a first voltage to frequency converter electrically connected between said temperature/time curve preconditioning circuit and said microcomputer for inputting said second output signal into said microcomputer,
an analog multiplexer electrically coupled to said adjustable temperature preset means, said adjustable timing circuit means, and said temperature circuit,
a second voltage to frequency converter electrically connected between said analog multiplexer and said microcomputer for inputting data into said microcomputer,
said analog multiplexer being controlled by said microcomputer whereby the said first output signal corresponding to the sense temperature is inputted to said microcomputer.

15. The apparatus described in claim 14 which further comprises:
a visual display means and an indicator means electrically connected to the output of said microcomputer, said visual display means indicating the time countdown data of the cooking cycle and said indicator means giving sensory indication in response to said control signal generated at the completion of the cooking cycle.

16. The apparatus described in claim 15 wherein said visual display means comprises:

LCD display means, seven segment decoders/drivers electrically coupled to said LCD display means and to said microcomputer whereby the output data from said microcomputer is displayed on said LCD displays.

17. The apparatus defined in claim 15 which further comprises a temperature display switch electrically coupled to said microcomputer whereby the momentary actuation of said temperature display switch will result in said microcomputer interrupting the display of the timing countdown data on said display means and will display the actual sensed temperature of the cooking medium and after releasing the temperature display switch the timing countdown will again be shown on said display means.

18. The apparatus defined in claim 15 wherein said apparatus can control the cooking time cycle of two food items being prepared in the cooking medium at the same time, said microcomputer monitoring the times of both items on separate channels of said microcomputer, said microcomputer controlling the visual display means such that only the timing countdown data for the food item that is closest to completion is displayed.

19. The apparatus defined in claim 15 wherein said temperature/time preconditioning circuit further comprises:

an adjustable voltage divider network for adjusting the interrelationship between the changes in cooking time which results from the differences between the preset cooking temperature and the actual temperature of the cooking medium.

20. The apparatus defined in claim 15 which further comprises:

an electrical actuating means coupled to the output of said microcomputer for use in mechanically removing cooked food items from the cooking medium upon the completion of the cooking time cycle, said electrical actuating means being actuated by said control signal generated at the completion of the cooking cycle.

21. The apparatus defined in claim 20 wherein said electrical actuating means comprises:

two basket control relays connected to said microcomputer, each of said basket control relays controlling the operation of a motor driven basket lift mechanism and an auto/manual relay electrically interconnected with both of said basket control relay and actuated by an auto/manual line which permits automatic switching of said apparatus from an automatic mode to a manual mode when the power to said apparatus is terminated.

22. The apparatus defined in claim 15 further comprising a high temperature inhibit circuit means electrically connected to said temperature circuit, said high temperature inhibit circuit means comprising:

a means for generating a presettable high temperature reference signal, a comparator for comparing the reference signal with the sensed temperature and means for generating an inhibit signal when the sensed temperature of said medium is greater than the high temperature reference signal.

23. The apparatus defined in claim 22 wherein said microcomputer inhibits the timing countdown of any then operating cooking cycle in response to said high temperature inhibit signal and further actuates said indicator means as a warning signal.

24. The apparatus defined in claim 15 further comprising a low temperature inhibit circuit means electrically connected to said temperature/time preconditioning circuit, said low temperature inhibit circuit means comprising:

a means for generating a presettable low temperature reference signal, a comparator for comparing the reference signal with the sensed temperature and means for generating an inhibit signal when the sensed temperature of said medium is lower than the low temperature reference signal.

25. The apparatus defined in claim 24 wherein said microcomputer inhibits the timing countdown of any then operating cooking cycle in response to said low temperature inhibit signal and further prevents the initiation of a new cooking cycle.

26. The apparatus defined in claim 15 which further comprises:

a plurality of product select switches, each of said product select switches corresponding to one of the plurality of food items that is to be timed and controlled by said apparatus, said product select switches being electrically coupled to said microcomputer by a bidirectional bus which allows for input to, and output from, individual channels of said microcomputer, said adjustable timing circuit means further comprising a plurality of adjustable input means for inputting a plurality of preset times into said microcomputer, each of said preset times being inputted on individual channels which correspond to the channels accessed by said product select switches, a mode select switch electrically coupled to said temperature sensor, said adjustable timing circuit means and said microcomputer; said mode select switch having a first position which couples said preset timing circuit means to said microcomputer whereby individual preset cooking times for a plurality of food items can be inputted by said adjustable input means into said microcomputer and displayed on the visual display means when the individual channels of said microcomputer are accessed by the actuation of said product select switches, said mode select switch having a second position wherein said temperature sensor is coupled to said microcomputer in the operating mode for said apparatus.

27. The apparatus defined in claim 26 wherein said adjustable input means comprise a series of adjustable voltage divider networks.

28. The apparatus defined in claim 26 wherein said mode select switch has a third position wherein the timing of the cooking cycle is inhibited and a recovery test time mode is indicated whereby said microcomputer measures the time it takes to raise the temperature of the cooking medium from a preselected low operating temperature to the preset operational temperature.

29. The apparatus defined in claim 28 wherein said mode select switch has a fourth position wherein a constant temperature is simulated in a test mode of operation and the countdown time data is displayed without temperature or time compensation.

30. The apparatus defined in claim 26 wherein said indicator means comprises:

a plurality of individual electrically activated indicators each indicator corresponding to one of the product select switches, said indicators electrically connected to the bidirectional bus which couples said product select switches to said microcomputer, said indicators being actuated when the product select associated therewith has been actuated in order to initiate the timing cycle for the selected food item and at the conclusion of the cooking cycle the indicator corresponding to the particular food item being prepared flashes in order to signal the completion of the cooking cycle.

31. The apparatus defined in claim 30 wherein said indicator means further comprises an auditory signalling device electrically connected to said microcomputer which is actuated to signal the completion of the cooking cycle.

32. The apparatus defined in claim 31 which further comprises:

a quality control switch electrically connected to said microcomputer for accessing a quality control time cycle which measures the time from completion of the last food item cooked until the food item is considered no longer saleable.

33. The method of timing and controlling the cooking cycle of a food item from the time the food item is inserted into a cooking medium, said method comprising:

establishing a preset operating temperature for the cooking medium, establishing a preset cooking time of the food item based on said preset operating temperature, generating a time/temperature relationship based on said preset operating temperature; said time/temperature relationship establishing time factors for the differences between the actual operating temperature and said preset operating temperature; the time factors when multiplied by said preset cooking time will generate an actual cooking time which will yield a properly cooked food item;

measuring the actual operating temperature of the cooking medium, comparing said actual operating temperature with said preset operating temperature and determining the correct timing factor based on the difference between said preset and said actual operating temperature, computing the actual cooking time of the food item by multiplying said preset cooking time by the correct timing factor, measuring said actual cooking time of the food item from the time of its insertion into the cooking medium, generating a termination signal at the end of said actual cooking time.

34. The method described in claim 33 which further comprises:

actuating a sensory indicator in response to said termination signal generated at the end of said actual cooking time.

35. The method described in claim 33 which further comprises:

actuating a mechanism in response to said termination signal generated at the end of the said actual cooking time whereby the food item is removed from the cooking medium.

36. The method described in claim 35 which further comprises:

actuating a sensory indicator in response to said temination signal at the end of said cooking time.

* * * * *